(12) United States Patent
Iwashita et al.

(10) Patent No.: US 6,177,774 B1
(45) Date of Patent: *Jan. 23, 2001

(54) MOTOR CONTROLLER BASED ON PWM SYSTEM

(75) Inventors: Yasusuke Iwashita; Tokuhisa Matsukane, both of Yamanashi (JP)

(73) Assignee: Fanuc Limited, Yamanashi (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/256,474

(22) Filed: Feb. 23, 1999

(30) Foreign Application Priority Data

Feb. 27, 1998 (JP) .................................................. 10-061887

(51) Int. Cl.⁷ .............................. H02P 7/29; H02H 7/085

(52) U.S. Cl. ......................... 318/434; 318/722; 388/903

(58) Field of Search .................................. 318/430–434, 318/722, 801, 811; 388/903; 361/23, 31

(56) References Cited

U.S. PATENT DOCUMENTS

| | | | |
|---|---|---|---|
| 3,851,216 | * 11/1974 | Clarke et al. | |
| 3,875,464 | * 4/1975 | Gary et al. | |
| 4,449,080 | 5/1984 | Konrad et al. | 318/139 |
| 4,514,667 | * 4/1985 | Sakmann et al. | 318/254 |
| 4,528,486 | * 7/1985 | Flaig et al. | 318/254 |
| 4,558,264 | * 12/1985 | Weischedel | 318/254 |
| 4,914,371 | * 4/1990 | Shibata et al. | 318/798 |
| 5,027,046 | * 6/1991 | Beg | 318/603 |
| 5,491,978 | * 2/1996 | Young et al. | 62/126 |
| 5,592,355 | * 1/1997 | Ikkai et al. | 361/94 |
| 5,721,474 | * 2/1998 | Lee et al. | 318/434 |
| 5,747,833 | * 5/1998 | Fujisaki et al. | 318/808 |
| 5,859,510 | * 1/1999 | Dolan et al. | 318/254 |

FOREIGN PATENT DOCUMENTS

| | | |
|---|---|---|
| 3318909 A1 | 12/1983 | (DE) . |
| 62-12395 | 1/1987 | (JP) . |
| 62-48201 | 3/1987 | (JP) . |
| 62-296794 | 12/1987 | (JP) . |
| 63-187535 | 1/1988 | (JP) . |
| 2-202369 | 8/1990 | (JP) . |
| 3-30797 | 3/1991 | (JP) . |
| 3-124799 | 12/1991 | (JP) . |
| 4-85281 | 3/1992 | (JP) . |
| 4-197098 | 7/1992 | (JP) . |
| 5-30771 | 2/1993 | (JP) . |
| 6-319263 | 11/1994 | (JP) . |
| 8-107602 | 4/1996 | (JP) . |
| 9-47085 | 2/1997 | (JP) . |

* cited by examiner

Primary Examiner—Bentsu Ro
(74) Attorney, Agent, or Firm—Staas & Halsey LLP

(57) ABSTRACT

A motor controller for controlling currents flowing to a motor by the PWM system includes interruption-restart controller for interrupting supply of PWM commands for at least one phase when the actual current flowing in at least one motor phase has exceeded a specified value, and for thereafter restarting PWM command supply. When the actual current flowing to the motor has reached a previously determined anomalous level, control is performed to interrupt and restart supply of PWM commands. By interrupting the supply of the PWM commands, the current flowing to the motor is returned from an anomalous level to a normal level and the equipment protected. After the motor current is returned to a normal level by the interruption of PWM command supply, PWM command supply is resumed, normal control by PWM command is again performed, and a non-controlling state in the controller is avoided.

16 Claims, 19 Drawing Sheets

MOTOR CONTROLLER BASED ON PWM SYSTEM

BACKGROUND OF THE INVENTION

1. Field of the Invention

This invention relates to a motor controller for performing drive control based on the PWM (pulse width modulation) system, for the purpose of protecting amplifiers and motors against anomalous currents and achieving high operating efficiency therein.

2. Description of the Related Art

PWM is a known system for controlling AC motors such as induced-current three-phase synchronous motors and permanent magnet synchronous motors. When control is performed with the PWM system, the voltage applied to the motor is actually varied by altering the on-off time ratio of such switching elements as a drive transistors in a power conversion circuit.

When controlling a motor using such the PWM system, there are cases where the actual current being supplied to the motor becomes abnormally high for an instant relative to a current command. There are a number of primary causes of these anomalous currents, including (a) the current exhibiting intermittent oscillation due to the current control gain being set high, resulting in spikes in the actual current, (b) noise being added to the feedback current fed back to the control circuit from the motor, resulting in spikes in the actual current, and (c) inadequate voltage for controlling motor current when the motor is turning at high speed, making it impossible to obtain the designed control characteristics in the current control loop, resulting in control instability and spikes in the actual current.

When the actual current increases abnormally as described above, anomalous currents flow to the amplifier and/or motor, creating a danger of failures in the power devices configuring the amplifier, the amplifier or motor wiring, or, in the case of permanent magnet synchronous motors, motor magnet demagnetization.

For these reasons, protective circuits have been provided in conventional motor control apparatuses to cope with such anomalous currents. These protective circuits compare the actual current with a fixed threshold value which was set for an anomalous currents and, when the actual current exceeds the threshold value, interrupt, in all phases, the PWM commands being sent to the power conversion circuit. Thus all current supply to the motor is cut off and the apparatus is put into an alarm status.

With such a protective circuit as this, it is possible to protect the amplifier power devices and the motor magnets, but, the current supplied to the motor is cut off. For this reason, the overall motor control apparatus is placed in an alarm generation status, and the apparatus being driven by the motor ceases to be under control.

A motor is ordinarily provided with a dynamic brake that runs current from the motor through a resistance and performs a stopping action. Therefore, when the protective circuit is activated and the supply of power to the motor is interrupted, an alarm status is entered wherein the entire system inclusive of the motor is stopped.

Usually, in an alarm status, not only is control of a motor stopped, but also entire system is stopped and kept uncontrolled. Accordingly, once this alarm status is in effect, it becomes impossible either to continue processing or movement, or to perform control. After this alarm status has been entered, moreover, it becomes necessary to restart the system and/or program, which requires operator intervention and results in a decline in the overall system operating rate.

Also, when the braking force of the dynamic brake is smaller than the torque required for deceleration, this can be hazardous, resulting even in work or stroke-end collisions.

SUMMARY OF THE INVENTION

An object of the present invention is to provide a motor controller based on the PWM system, wherewith, when anomalous currents develop, the apparatus can be protected without the controller being placed in a non-controlling state.

The present invention performs control wherein, when the actual current flowing to a motor reaches a preset abnormal level, supply to the PWM command is interrupted and restarted, and the current flowing to the motor is returned from the abnormal level to a normal level by interrupting the supply of the PWM commands, thereby protecting the apparatus. The motor controller according to the present invention is a motor controller for using a PWM system to control currents flowing to motors, comprising interruption and restart control means wherewith, when the actual current flowing in at least one phase of the motor exceeds a prescribed value, the PWM command supply in at least one phase is interrupted, after which PWM command supply is restarted.

By implementing the present invention, it is possible both to improve operating rates in controllers for feed shafts and main spindles in industrial machinery and in controllers for robot arms, etc., and to obtain the maximum performance available from amplifiers and motors, etc.

The motor controller according to the present invention is now described with reference to the simplified block diagram given in FIG. 1. In FIG. 1, the components involved in the control mechanism of the present invention are diagrammed in a simplified manner and other configurational elements are omitted.

A motor (not shown) uses a power converter unit 2 to convert a DC voltage supplied from a DC power supply 1 to a U-phase, V-phase, and W-phase, whereupon current is supplied to all phases of the motor. The power converter unit 2 comprises a set of switching devices for each phase, and supplies U, V, and W-phase current to the motor by complementarily turning the devices on and off according to PWM commands sent from a PWM controller 10.

In the PWM controller 10, a PWM command formation unit 11 receives current commands from a current control loop (not shown), forms PWM commands, and sends these PWM commands to the switching devices of the power converter unit 2 from a gate unit 12 via drivers (not shown). The PWM controller 10 also comprises interruption-restart control means. These interruption-restart control means interrupt the PWM command supply in at least one phase when the actual current flowing in at least one phase (of the U, V, and W-phases) of the motor exceeds the prescribed value, after which they restart the PWM command supply. These interruption-restart control means comprise an anomalous current detector 13 and a gate controller 14.

The anomalous current detector 13 detects the actual current supplied to the motor, compares that detected actual current value with a predetermined value, makes anomalous level decisions, and sends the results of such decisions to the gate controller 14. The U-phase, V-phase, and W-phase actual currents can be detected by providing a current detector 3 for each phase, or current detectors 3 may be provided for any two phases so that the current of the remaining phase can be calculated from the current values of the two phases detected by the current detector 3.

The gate controller 14 receives detection signals from the anomalous current detector 13, controls the gate unit 12, and interrupts and restarts the PWM commands supplied to the power converter unit 2 from the PWM command formation unit 11. When PWM command supply is interrupted, the switching devices of the power converter unit 2 enter an open state, and the current supply to the motor is interrupted. By interrupting this supply of PWM commands, the actual current that has reached an anomalous level drops and returns to a normal current level. When PWM command supply is restarted, the switching devices in the power converter unit 2 enter a control state, control of the current supply to the motor is restarted, and normal control can be performed.

The operation of the PWM controller 10 in the motor controller of the present invention is described now with reference to the flowchart given in FIG. 2.

The anomalous current detector 13 compares the actual currents of each phase with an anomalous level, using detected values from the current detector(s) 3 (step S1), and, when an anomalous level has been exceeded, communicates this anomaly to the gate controller 14. The gate controller 14 receives this communication, controls the gate unit 12, and interrupts the supply of PWM commands from the PWM command formation unit 11 to the power converter unit 2 (step S2). The gate controller 14, after interrupting the PWM command supply, verifies that the actual current has not reached an anomalous level, and thereupon performs PWM command restart processing (step S3).

The detection of the actual current may be performed by determining a prescribed value beforehand, corresponding to an anomalous level, and comparing this prescribed value with the actual current flowing in at least one of the phases. The actual current to be used for this comparison may be those for either two or all of the motor phases.

When the actual currents in a plurality of phases are used, it is possible to implement anomaly detection when the prescribed value is exceeded in any one of those phases, or when the prescribed value is exceeded in all of the phases, or, alternatively, when the prescribed value is exceeded by at least some prescribed number of phases.

The interruption and restarting control over the supply of PWM commands is performed for at least one motor phase (of the U, V, and W-phases), or, alternatively, it may be performed instead for two or more phases, or for all of the phases.

The motor controller according to the present invention is configured as described in the foregoing, wherefore, when an anomalous current occurs, the controller not only protects the apparatus, but is also able to keep the apparatus from entering a non-controlling state. Thus it is possible to improve the operating rates both of controllers for feed shafts and main spindles in machine tools and other industrial machinery and of controllers for robot arms, etc., and also to obtain the maximum performance available from amplifiers and motors, etc.

BRIEF DESCRIPTION OF THE DRAWINGS

The foregoing and other objects and features of the invention will become apparent from the following description of preferred embodiments of the present invention with respect to the accompanying drawings, in which.

DESCRIPTION OF THE PREFERRED EMBODIMENTS

Figure 5:
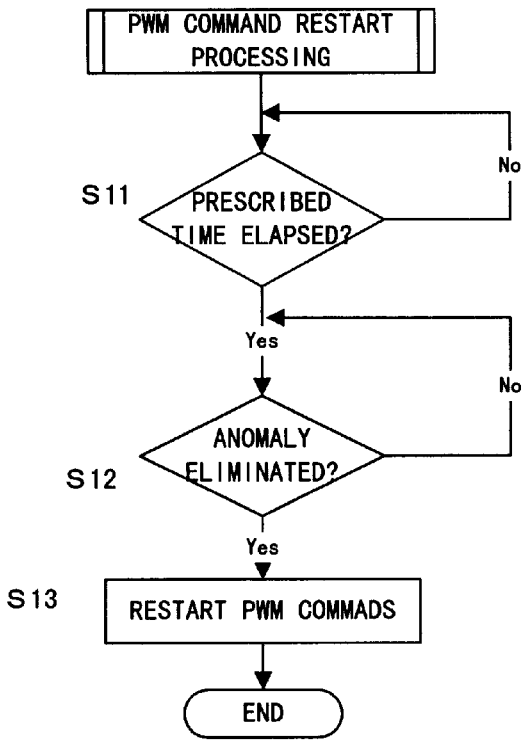
FIG. 5 is a flowchart for describing the PWM command restart processing performed by the gate controller in FIG. 3.

A first embodiment of the present invention is now described with reference to FIG. 3, FIG. 5, and FIG. 7.

Figure 3:
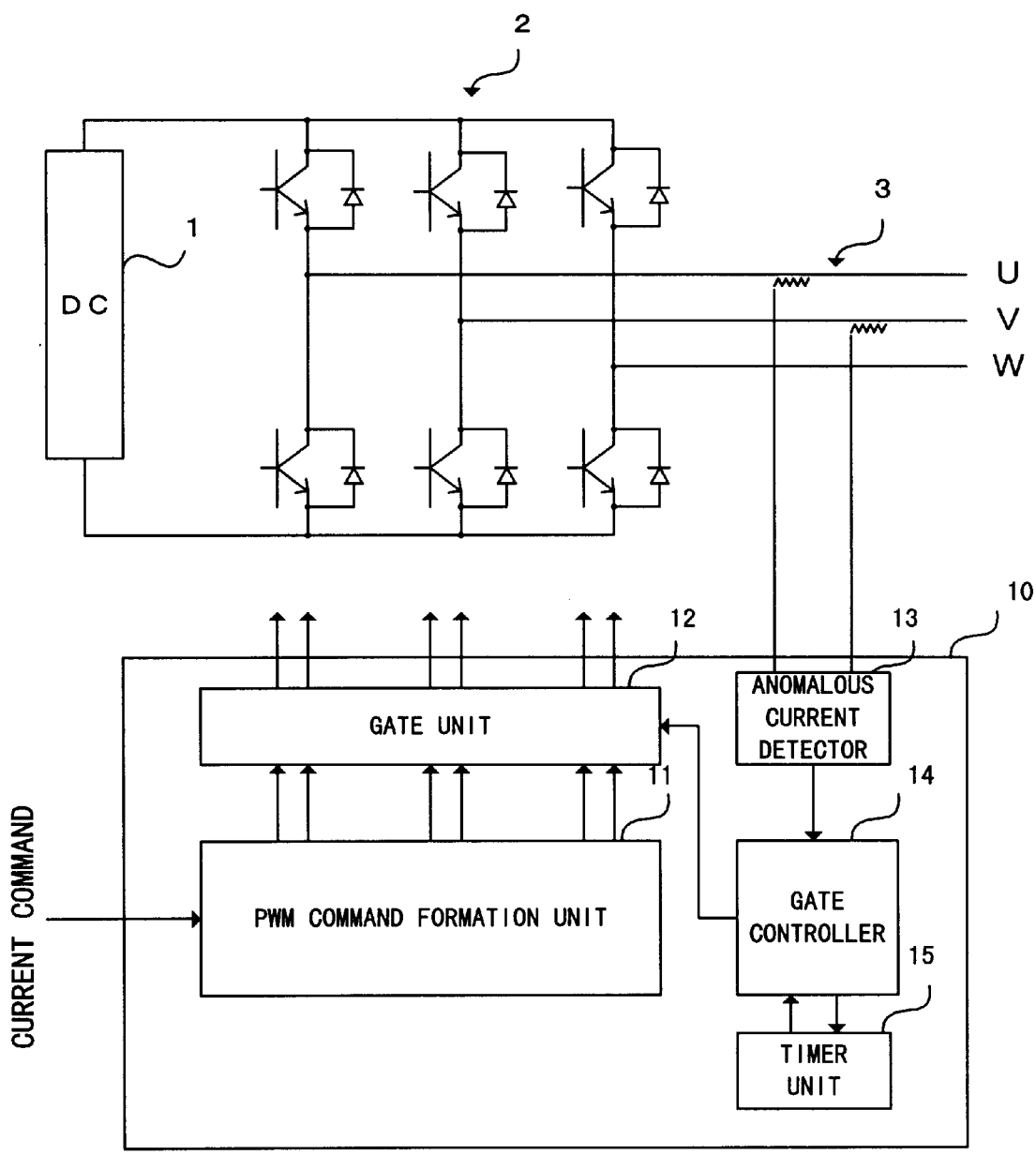
FIG. 3 is a simplified block diagram of a motor controller according to a first embodiment of the present invention.

In the motor controller based on the PWM system diagrammed in FIG. 3, interruption-restart control means begins processing since a certain time has elapsed after the interruption of the supply of PWM commands.

Figure 1:
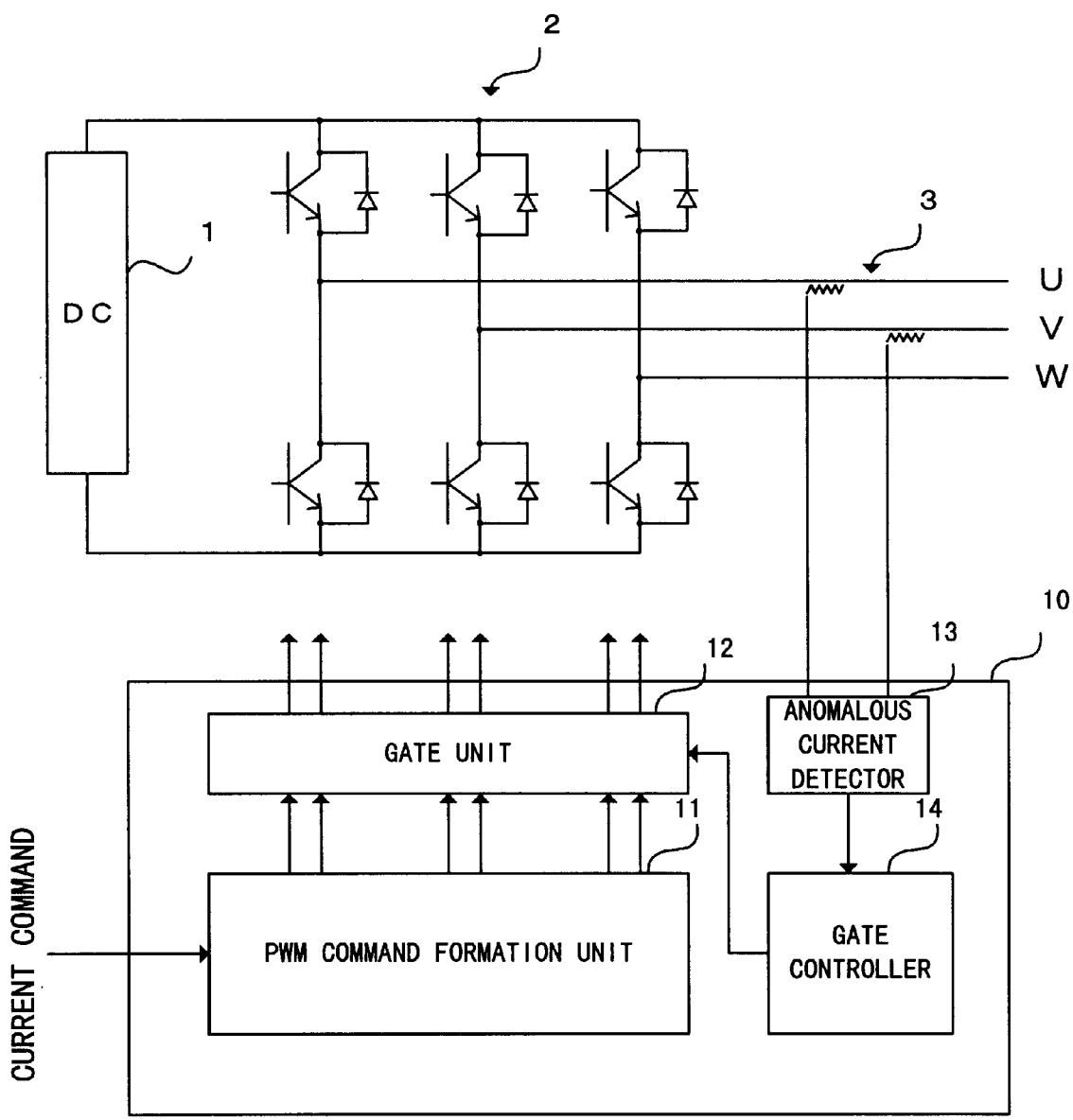
FIG. 1 is a simplified block diagram of a motor controller based on a PWM system, according to the present invention.

In FIG. 3, the DC power supply 1 that supplies current to a motor (not shown), the power converter unit 2, and the current detector 3 are the same as diagrammed in FIG. 1 and so are not further described here.

A PWM controller 10 comprises interruption-restart control means composed of an anomalous current detector 13, a gate controller 14 and a timer unit 15. When the actual current flowing in at least one phase of the motor exceeds a prescribed value, the interruption-restart control means interrupt PWM command supply for at least one phase, and then restart PWM command supply.

The anomalous current detector 13 detects the actual currents supplied to the motor, compares those actual currents with a preset value, performs anomalous level decisions, and sends the results of those decisions to the gate controller 14.

The gate controller 14 receives detection signals from the anomalous current detector 13, controls the gate unit 12, and interrupts and restarts the PWM commands to be supplied to the power converter unit 2 from the PWM command formation unit 11. In other words, when informed by the anomalous current detector 13 that an anomalous current has occurred, the gate controller 14 instructs the interruption of the supply of PWM commands to the gate unit 12 (steps S1 and S2 in the flowchart given in FIG. 2) and at the same time, starts the timer unit 15.

The PWM command restart processing performed by the gate controller 14 diagrammed in FIG. 3 is explained with reference to the flowchart in FIG. 5 and the timing chart in FIG. 7.

When the timer unit 15 begins running, the gate controller 14 begins monitoring to determine whether or not a predetermined prescribed time has elapsed. This prescribed time is a length of time such as is necessary for the actual current to drop from the anomalous level, due to the interruption of the current supply to the motor, and is set on the basis of values previously determined experimentally from the motor characteristics, etc.

When PWM command supply is interrupted, the switching devices in the power converter unit 2 are put in an open state, current supply to the motor is interrupted, and the actual current which reached an anomalous level drops to a normal current level.

After the prescribed time elapses after the timer unit 15 is started (step S11), the gate controller 14 verifies that this anomalous current condition has been eliminated (step S12), and performs processing to restart the supply of PWM commands to the gate unit 12. When PWM command supply has been restarted, the switching devices in the power converter unit 2 enter a controlling state, control of the current supply to the motor is resumed, and normal control is performed (step S13).

Figure 7:
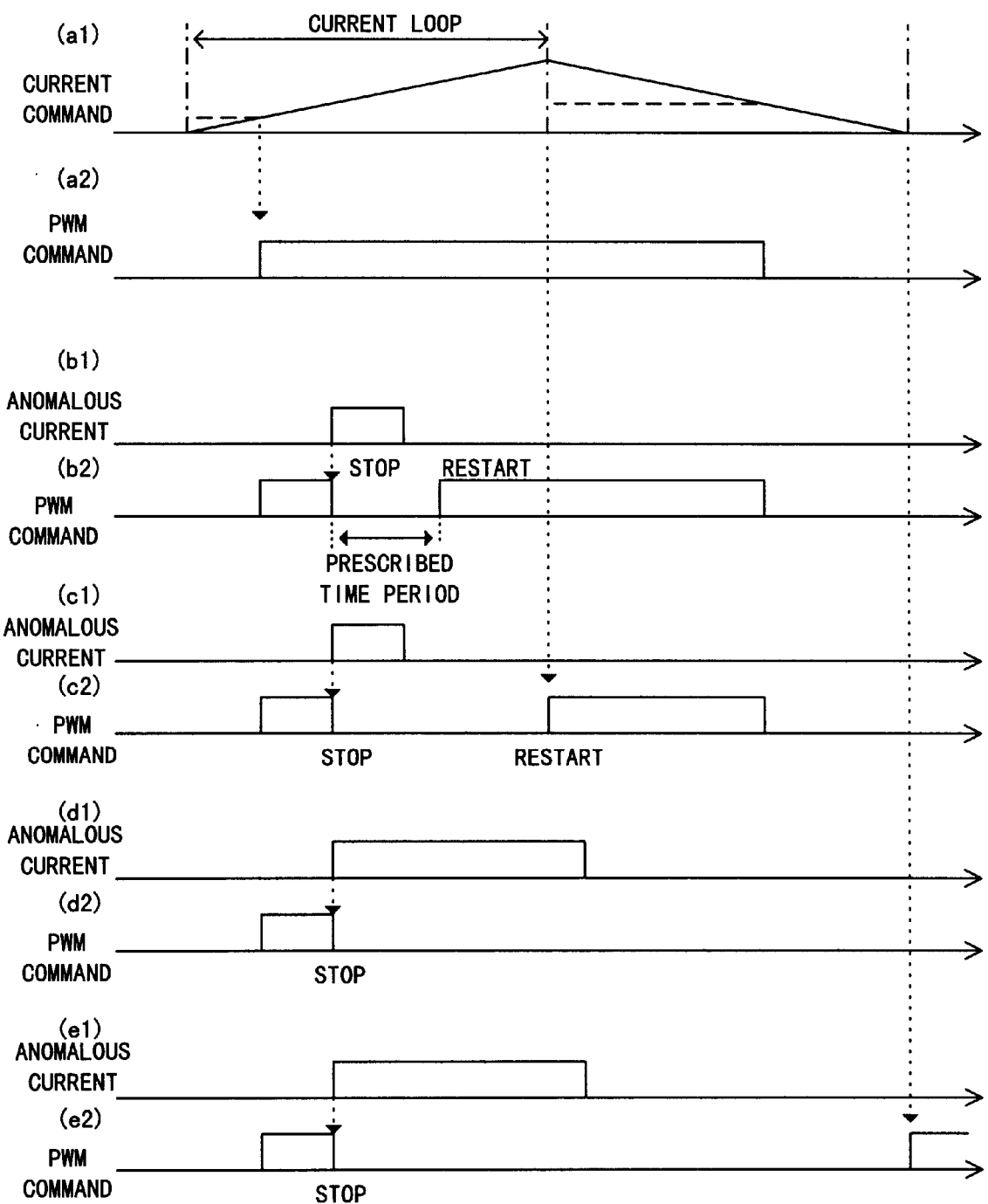
FIG. 7 is a timing chart for describing the PWM command restart processing performed by the gate controller in FIG. 3.

In FIG. 7, times in which anomalous currents have been generated are represented as high levels at (b1), (c1), (d1), and (e1), and times in which PWM commands are being supplied are represented as high levels at (b2), (c2), (d2), and (e2).

The combination of (b1) and (b2) in FIG. 7 represents that PWM commands have been interrupted due to the occurrence of an anomalous current, that anomalous current generation has been eliminated during the interval from the interruption of PWM commands until the prescribed time has elapsed, and that, accordingly, PWM commands are again supplied after the prescribed time since PWM command interruption has elapsed.

The combination (d1) and (d2) in FIG. 7, on the other hand, represents that PWM commands have been interrupted due to the occurrence of an anomalous current, that anomalous current generation has not been eliminated during the interval from the interruption of PWM commands until the prescribed time has elapsed, and that, therefore, the interruption of the PWM commands continues (i.e. that PWM command supply is not resumed). In this case, after generating an alarm or, alternatively, after the prescribed time has again elapsed, the same processing can be performed.

A second embodiment of the present invention is now described with reference to FIGS. 4, 6, 7, and 8.

Figure 4:
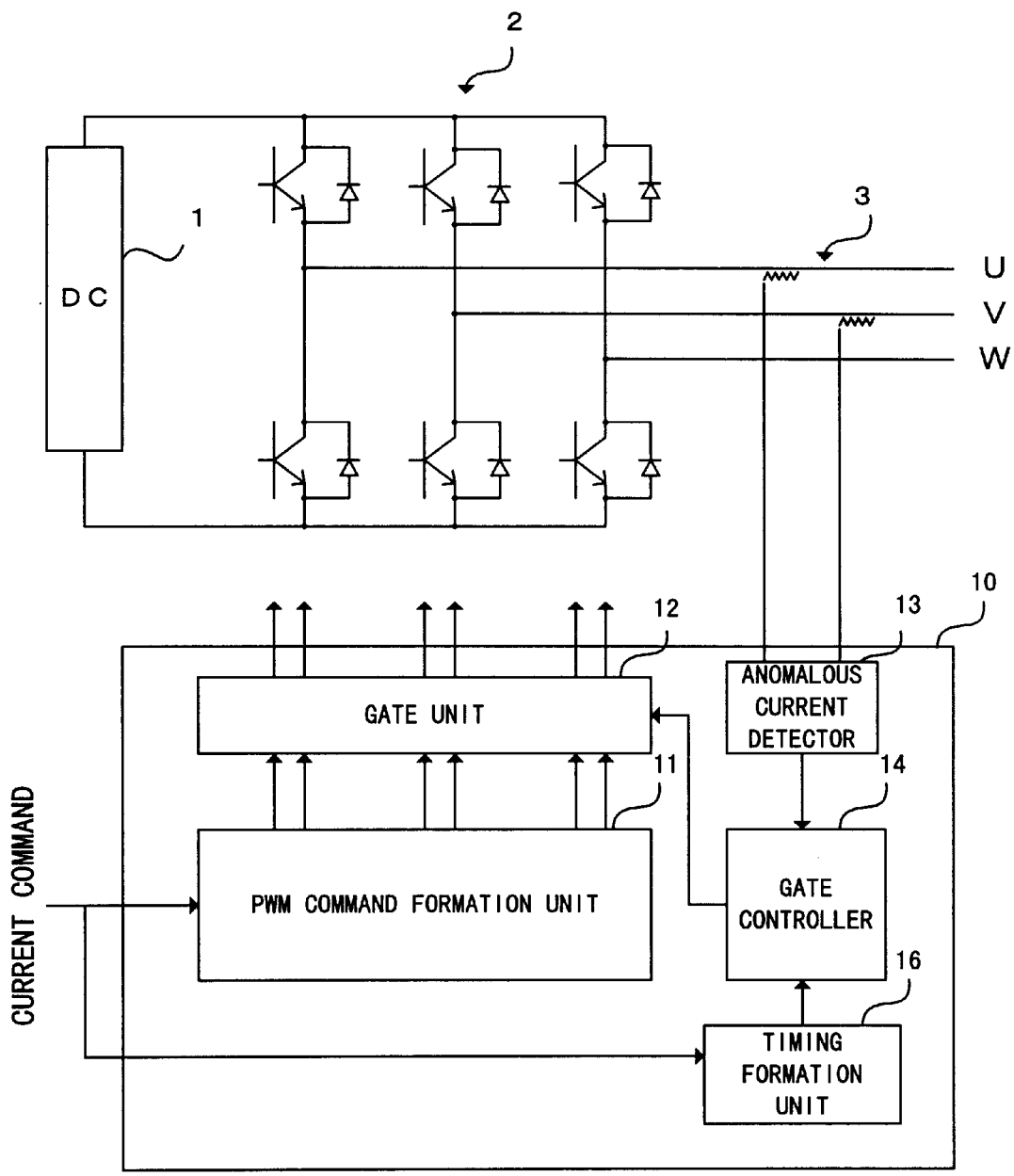
FIG. 4 is a simplified block diagram of a motor controller according to a second embodiment of the present invention.

When the motor controller based on the PWM system diagrammed in FIG. 4 is implemented, interruption-restart control means begin functioning during an interrupt in a current control loop.

The PWM controller 10 comprises interruption-restart control means composed of an anomalous current detector 13, gate controller 14 and timing formation unit 16. The anomalous current detector 13, diagrammed in FIG. 4, performs the same functions as the anomalous current detector 13 diagrammed in FIG. 3

The gate controller 14, just as the gate controller 14 in FIG. 3, receives detection signals from the anomalous current detector 13, controls the gate unit 12, and interrupts and restarts the PWM commands supplied to the power converter unit 2 from the PWM command formation unit 11. In other words, when informed by the anomalous current detector 13 that an anomalous current has occurred, the gate controller 14 instructs the interruption of the supply of PWM commands to the gate unit 12 (steps S1 and S2 in the flowchart given in FIG. 2). The gate controller 14 continually receives current control loop interrupt timing signals from the timing formation unit 16.

The timing formation unit 16 inputs current commands formed in the current control loop and detects interrupt timing for the current control loop.

Figure 6:
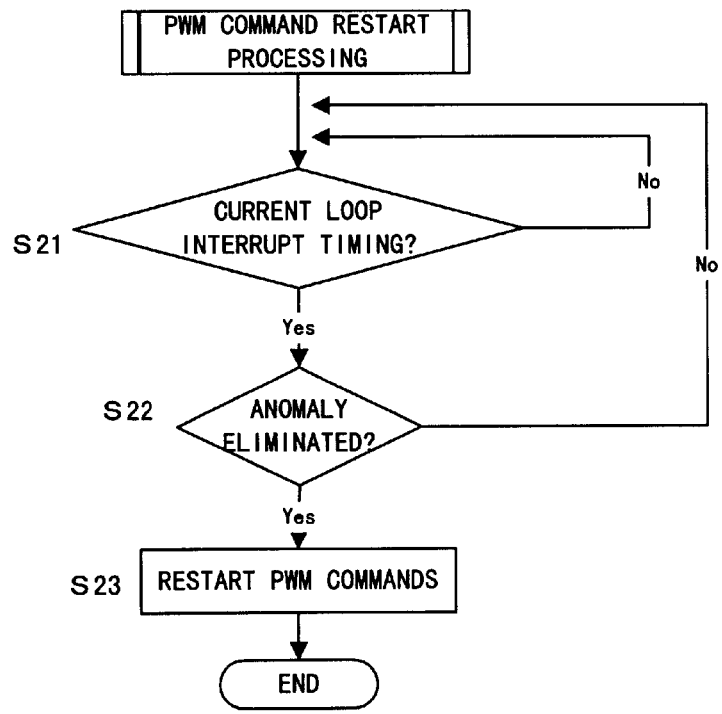
FIG. 6 is a flowchart for describing the PWM command restart processing performed by the gate controllers in FIG. 3 and FIG. 4.

The PWM command restart processing performed by the gate controller 14 diagrammed in FIG. 4 is now described with reference to the flowchart in FIG. 6 and the timing chart in FIG. 7.

The gate controller 14 monitors interrupts in the current control loop by means of inputs from the timing formation unit 16. Normally, in the PWM command formation unit 11, PWM commands are formed (cf. FIG. 7 (a2)) by making comparisons between triangular waves and current commands input (cf. FIG. 7 (a1)). Accordingly, PWM commands are formed every other time the current control loop is executed. The timing formation unit 16 detects the times of interrupts in these current control loops (step S21).

After PWM commands have been interrupted by the occurrence of an anomalous current (FIG. 7 (c1)), a decision as to whether or not the anomalous current has been eliminated is made at the time of an interrupt in the current control loop (step S22). When the anomalous current has been eliminated, PWM command supply is resumed (step S23; cf. FIG. 7 (c2)). If, on the other hand, the decision in step S22 is that the anomalous current has not been eliminated (FIG. 7 (e1)), PWM command supply is not resumed (FIG. 7 (e2)).

After this, the same processing is repeated at the time of the next current control loop interrupt, and PWM command supply is resumed. When PWM command supply is resumed, the switching devices in the power converter unit 2 enter a control state, control of current supply to the motor is restarted, and normal control is conducted.

Figure 8:
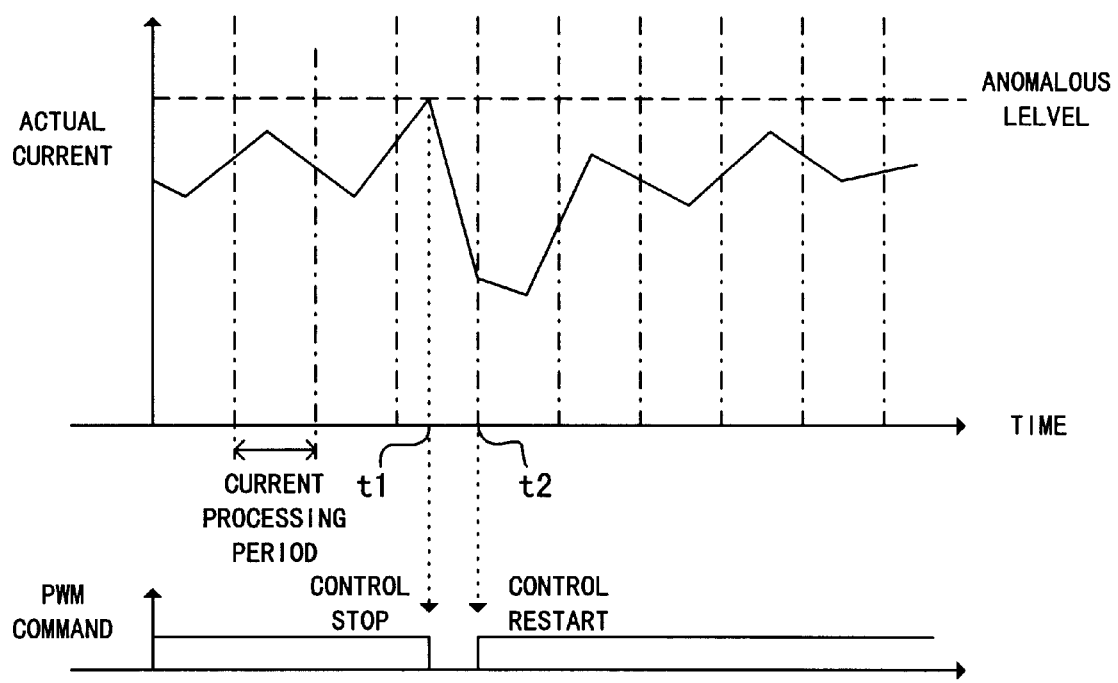
FIG. 8 is a diagram of the changes over time in actual current in the motor controller diagrammed in FIG. 4.

The variations in the actual current in the motor controller apparatus diagrammed in FIG. 4 are charted in FIG. 8.

In FIG. 8, PWM command supply is interrupted at the point in time (t1 in the diagram) where the actual current reaches an anomalous level, whereupon the actual current drops from the anomalous level and returns to a normal level. PWM command supply is then resumed at the point in time (t2 in the diagram) where execution of the one current control loop is restarted. After that, motor control is performed normally.

A third embodiment of the present invention is now described with reference to FIGS. 9, 10, 11, and 12.

Figure 9:
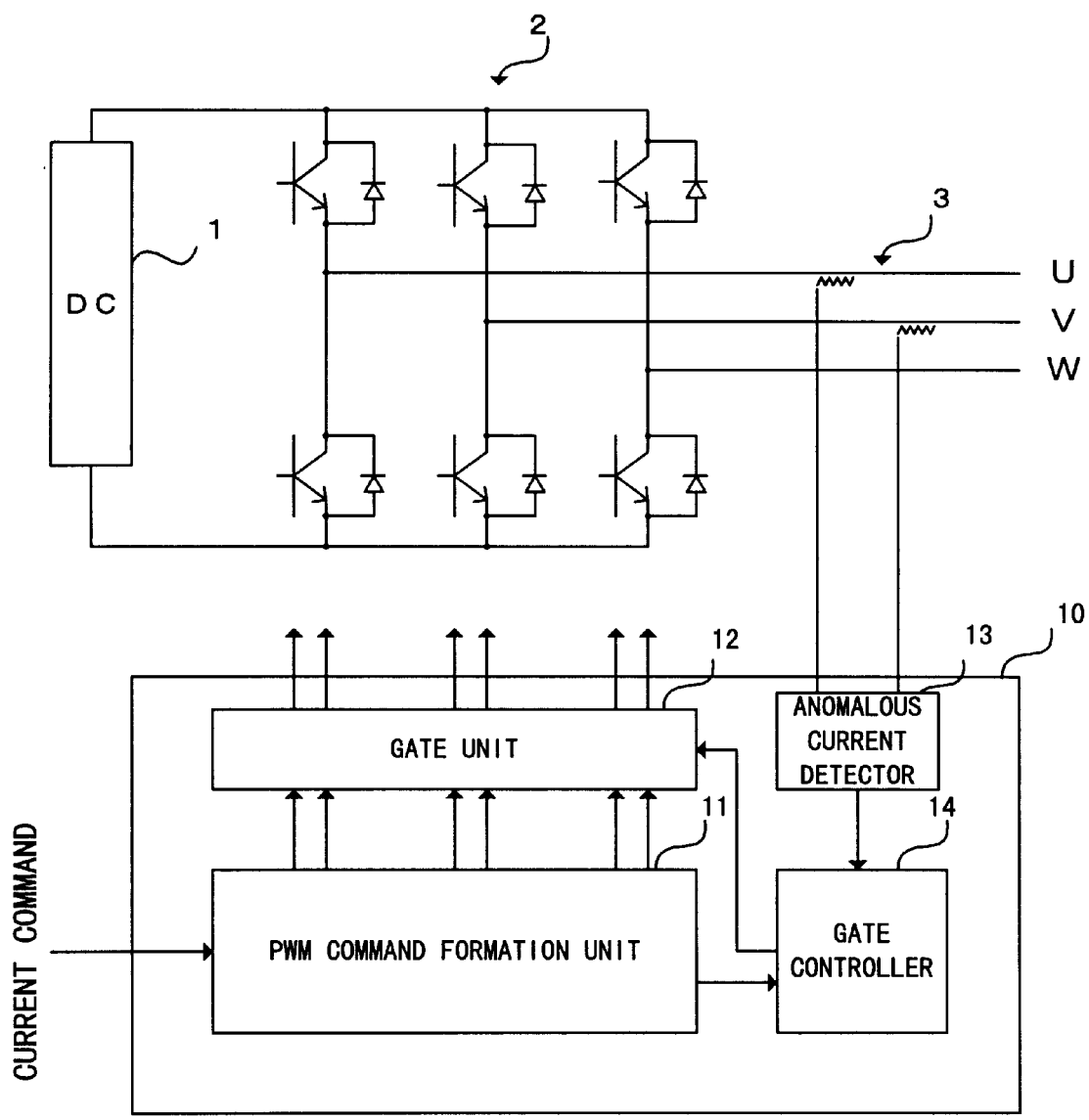
FIG. 9 is a simplified block diagram of a motor controller according to a third embodiment of the present invention.

When the motor controller based on the PWM system diagrammed in FIG. 9 is implemented, the interruption-restart control means begin processing when the PWM command signal changes.

The PWM controller 10 comprises interruption-restart control means composed of an anomalous current detector 13 and a gate controller 14. The anomalous current detector 13, as diagrammed in FIG. 9, perform the same functions as the anomalous current detector 13 diagrammed in FIG. 3.

The gate controller 14 inputs detection signals from the anomalous current detector 13 and at the same time controls a gate unit 12, inputting at least the rise and fall signals of the PWM signals from a PWM command formation unit 11, interrupting and restarting the PWM commands supplied to the power converter unit 2 from the PWM command formation unit 11.

Figure 2:
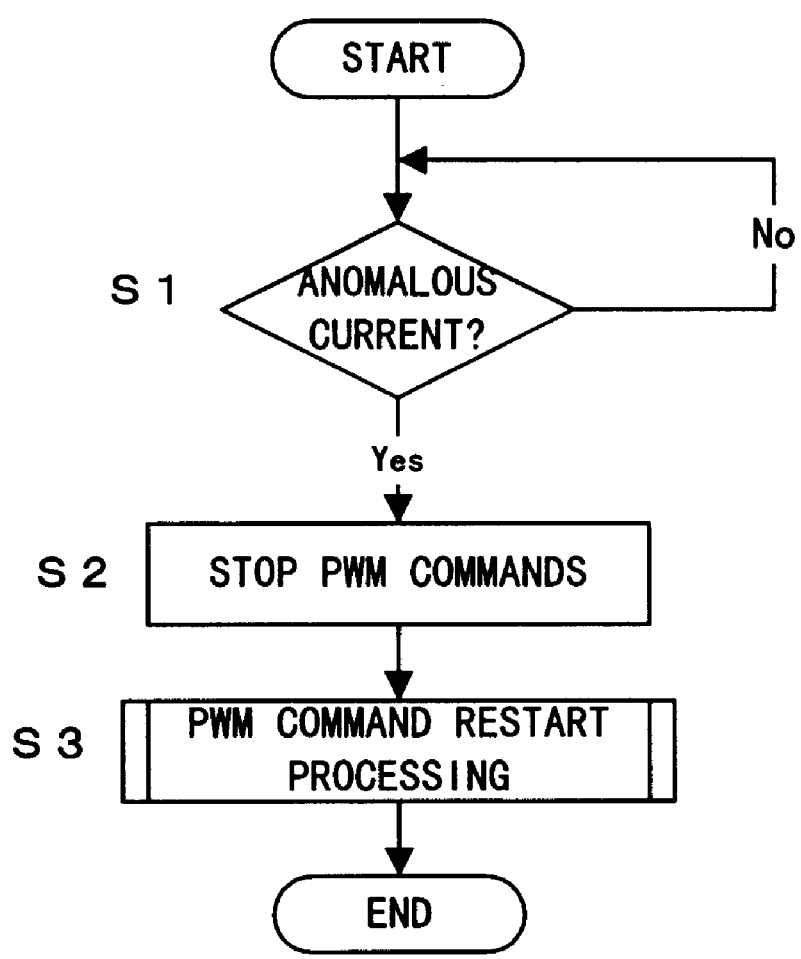
FIG. 2 is a flowchart for describing the operation of the PWM controller in the motor controller of the present invention.

The gate controller 14, as the gate controller 14 in FIG. 3, receives detection signals from the anomalous current detector 13 and, when the occurrence of an anomalous current is detected, instructs the interruption of the PWM command supply to the gate unit 12 (steps S1 and S2 in FIG. 2).

The gate controller 14 also continually detects rises and falls in the PWM command signals coming from the PWM command formation unit 11. That is, the gate controller 14 detects instances where, in the power converter unit 2, the command for any of the phases results either in the change from ON state of a first switching device to ON state of a second switching device which constitutes a pair with the first switching device, or, conversely, the change from ON state of the second switching device to ON state of the first switching device.

The gate controller 14 inputs rise and fall signals in the PWM commands noted above coming from the PWM command formation unit 11, or inputs the PWM commands to form rise and fall signals for those PWM commands, and determines the timing for the resumption of PWM command supply.

Figure 10:
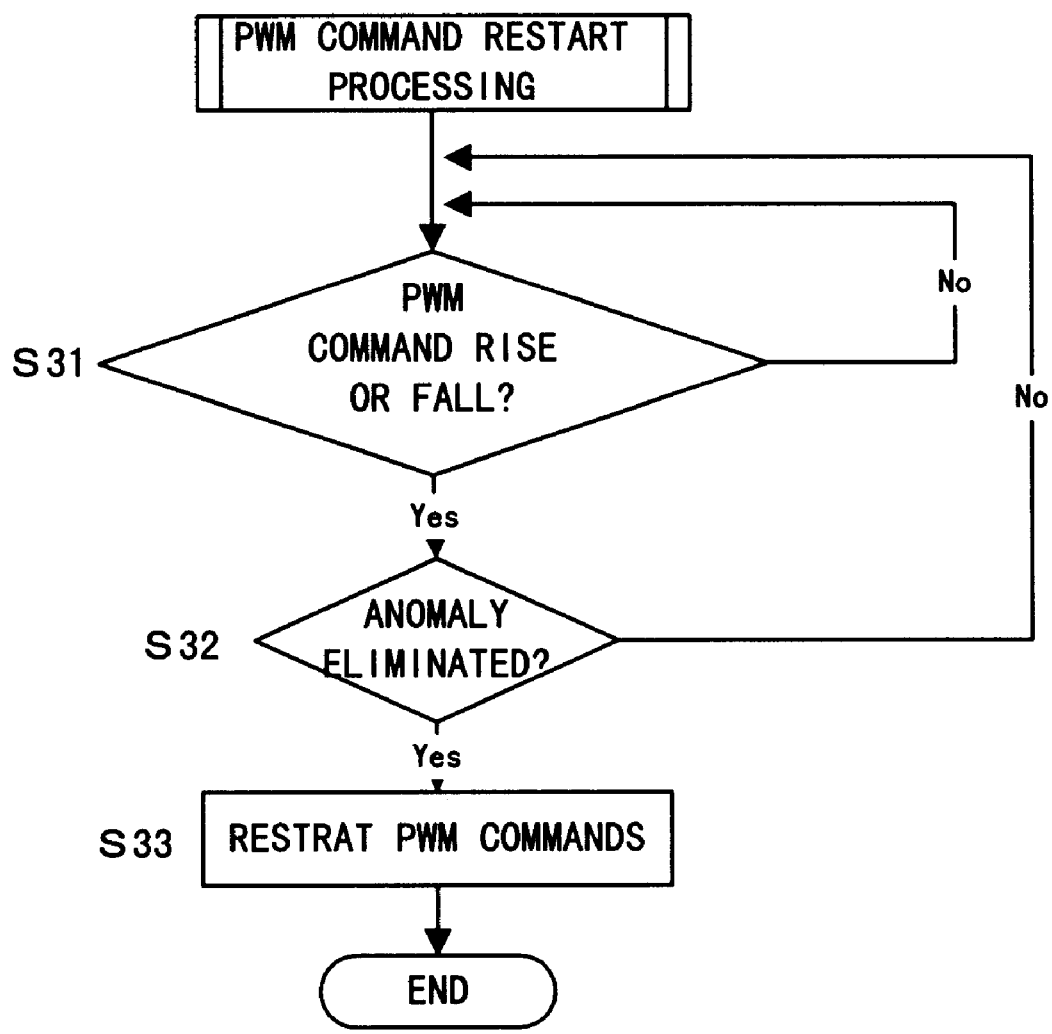
FIG. 10 is a flowchart for describing the PWM command restart processing performed by the gate controller in FIG. 9.

The PWM command restart processing performed by the gate controller 14 is now described with reference to the flowchart in FIG. 10 and the time chart in FIG. 11.

Figure 11:
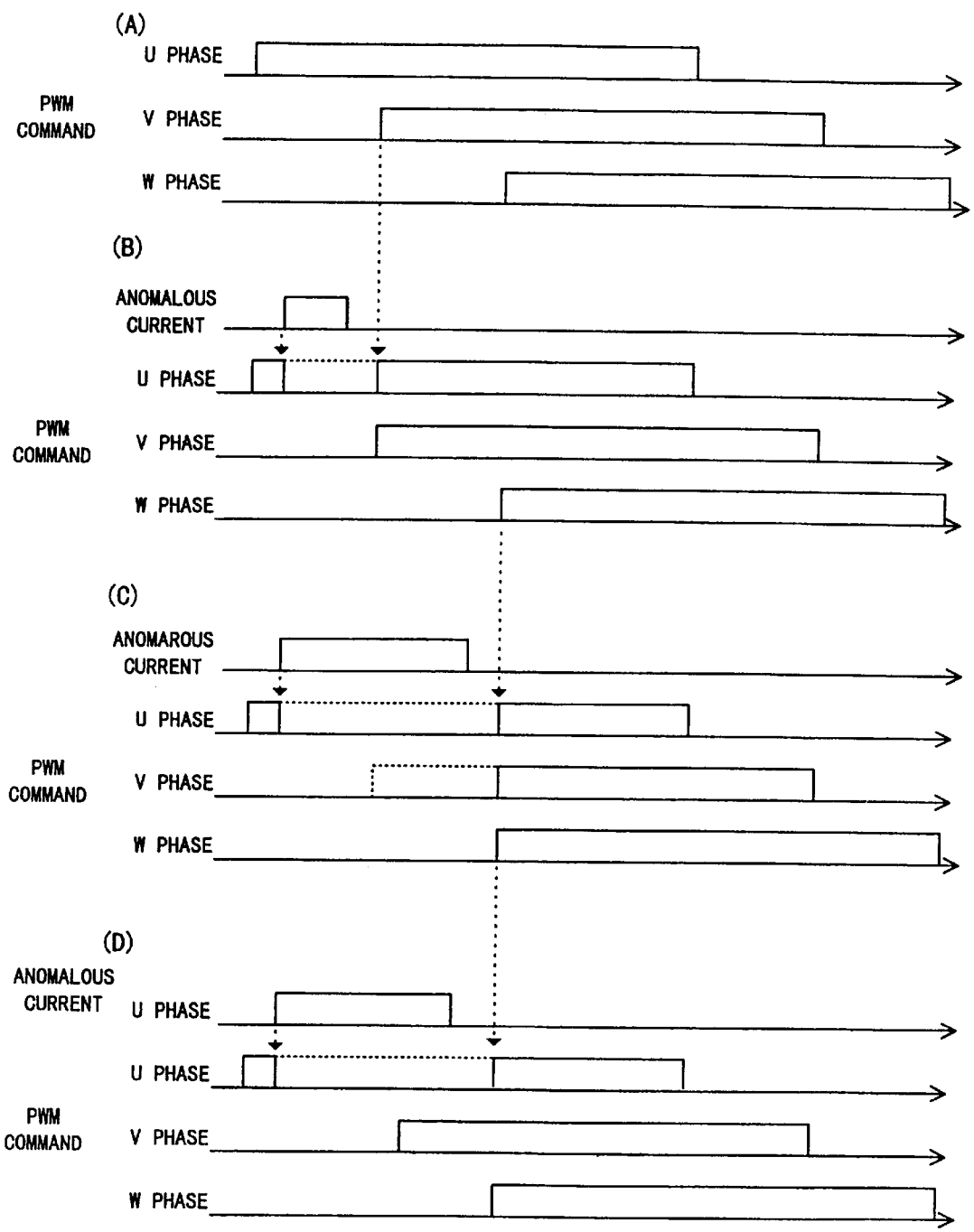
FIG. 11 is a signal status diagram for describing the PWM command restart processing performed by the gate controller in FIG. 9.
Figure 12:
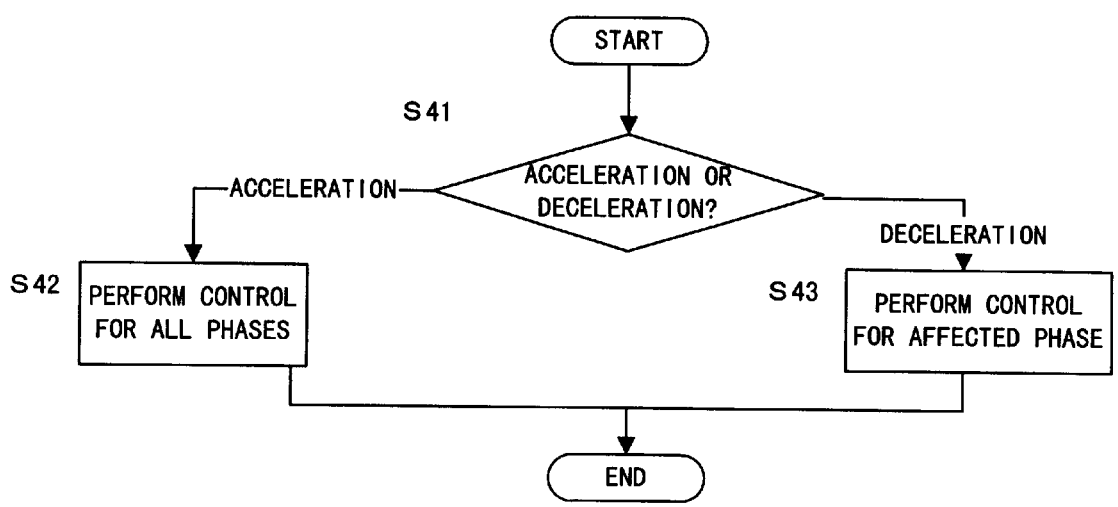
FIG. 12 is a flowchart for describing PWM command supply control mode selection.

FIG. 11 diagrams the relationship between anomalous currents and the PWM commands supplied. In FIG. 11, (A) shows PWM commands for the U, V, and W-phases. (B), (C), and (D) shows PWM commands for the U, V, and W-phases when an anomalous current has occurred. (B) and (C) are cases where the PWM command supply is interrupted in all phases when there is an anomaly. (D) is a case where, when an anomaly occurs, the PWM command supply is interrupted only for the phase (U phase) in which the anomaly has occurred.

The gate controller 14 monitors PWM command supply resumption by the rises and falls in the PWM commands (step S31). Thereafter, processing routines are divided among the cases described below.

The U-phase PWM command is interrupted by the occurrence of an anomalous current in any phase, whether U, V, or W. After the U-phase PWM command is interrupted, monitoring is conducted to determine whether or not there has been a rise or fall in the PWM command formed by the PWM command formation unit 11 (step S31).

If, as in the case (B) in FIG. 11, the generation of the anomalous current has been eliminated by the time of the V-phase rise, that anomalous current elimination is detected (step S32), and U-phase PWM command supply is resumed at the time of V-phase rise (step S33).

If, on the other hand, as in the case (C) represented in FIG. 11, anomalous current generation has not been eliminated by the time that the V-phase rise is supposed to occur, anomalous current elimination is not detected (step S32), and U-phase PWM command supply is not resumed. In other words, U-phase PWM command supply interruption is continued. In this case (C), the anomalous current will be eliminated by the time of the next W-phase rise, so the W-phase PWM command supply (and the U-phase and V-phase PWM command supply following thereupon) is performed normally. The supply of the following U-phase PWM command is resumed at the time of the supply of the W-phase PWM command.

When PWM command supply has been resumed in all phases, in this manner, the switching devices in the power converter unit 2 enter the control state, control of the current supply to the motor is resumed, and normal control is implemented.

In cases (B) and (C), in FIG. 11, as discussed above, U-phase, V-phase, and W-phase PWM command supply is interrupted whenever an anomalous current occurs in any phase.

In case (D) in FIG. 11, however, only U-phase PWM command supply is interrupted when an anomalous current occurs in the U-phase.

In other words, when an anomalous current occurs in the U-phase, the gate controller 14 interrupts, from the gate unit, the supply of PWM commands to the phase (U-phase) wherein that anomalous current occurred. However, the supply of PWM commands to the V-phase and W-phase is not interrupted. When the anomalous current in the U-phase has been eliminated, the supply of U-phase PWM commands is resumed at the time of the supply of W-phase PWM commands, as in case (C).

For PWM command supply control, any one of all-phase control as described above and control only for the phase wherein the anomaly occurred can be selected according to the motor control mode. That being so, an example of the selection of PWM command supply control modes is now described with reference to the flowchart given in FIG. 12. In the example diagrammed in FIG. 12, the motor control mode consists of acceleration control and deceleration control.

The gate controller 14 determines (in step S41) whether current commands are being input in conjunction with a need to implement motor acceleration control or motor deceleration control. In the case of acceleration control, PWM command supply control is performed for all phases, i.e. U, V, and W (step S42). In the case of deceleration control, on the other hand, PWM command supply control is only performed for the phase concerned (step S43).

By implementing PWM command supply control as described in the foregoing, it is possible to speed up the diminishment of a current resulting in an anomalous condition during motor deceleration, and also to suppress the decline in acceleration capability during acceleration by reducing the effect of interrupting PWM command supply.

A fourth embodiment of the present invention is now described with reference to FIGS. 13, 14, and 15.

In this embodiment, the motor controller generates an alarm when an anomalous conditions occurs continuously or when the frequency of anomalous condition occurrence is high. The interruption-restart control means count a PWM command interruption control every time a current control loop is executed; when the value of the continuous count exceeds a specified value, it generates an alarm, and when an anomalous condition occurs continuously it generates an alarm.

Figure 13:
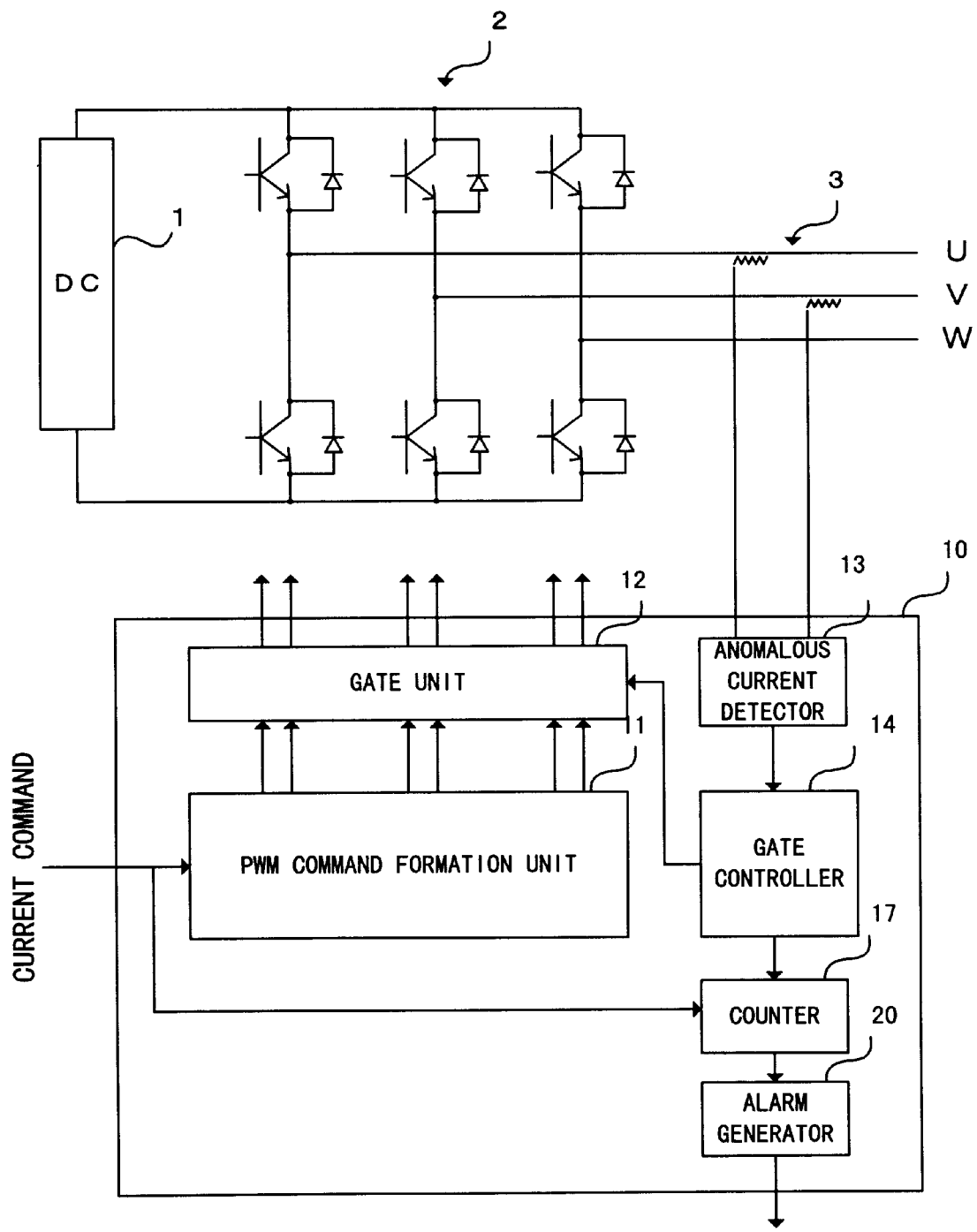
FIG. 13 is a simplified block diagram of a motor controller according to a fourth embodiment of the present invention.

The motor controller based on the PWM system diagrammed in FIG. 13 comprises interruption-restart control means composed of an anomalous current detector 13 and a gate controller 14, as diagrammed in FIG. 9. These interruption-restart control means, as in the first embodiment, interrupt the supply of PWM commands in at least one phase when the actual current flowing in at least one phase of the motor exceeds a prescribed value, and then restart the supply of PWM commands.

In this motor controller, alarm generation means are formed by a counter 17 and an alarm generator 20. The counter 17 counts a PWM command interruption control every time a current control loop is executed, receives information to the effect that PWM command supply is in an interrupted state from the gate controller 14, and counts the number of executed current control loops during interruption control. The alarm generator 20 receives the value of this count of the counter 17 and, when that value exceeds a predetermined number of iterations, determines that an anomalous condition is continuously occurring and generates an alarm.

Figure 14:
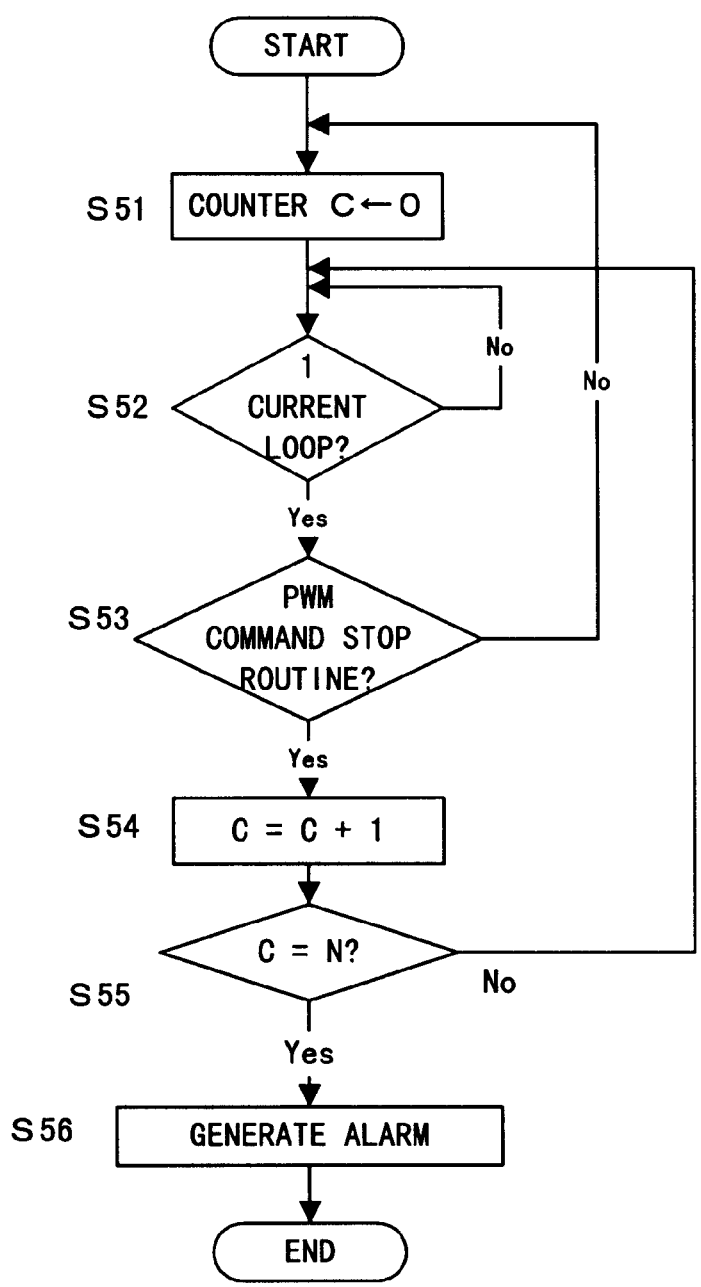
FIG. 14 is a flowchart for describing the alarm action performed by the PWM controller in FIG. 13.

The alarm operation performed by the PWM controller 10 is now described using the flowchart in FIG. 14.

After the count value C in the counter 17 is initialized to "0" (step S51), a current command is input and a decision is made (in step S52) as to whether or not execution of one current control loop is finished. When the execution of one current control loop is finished, a decision is made (in step S53) as to whether, based on a command from the gate controller 14, PWM commands are being supplied or the supply of PWM commands is being interrupted. When PWM command supply is being interrupted, the count value C in the counter 17 is incremented by "1" every time one current control loop execution is completed (step S54).

The alarm generator 20 compares the count value C in the counter 17 with a predetermined set value N (step S55), and generates an alarm when that count value C has reached the set value N (step S56). Meanwhile, when it has been determined in step S55 that the count value C has not yet reached the set value N, process returns to step S52, and a cumulative count indicating how many current control loops have been executed during the time when PWM commands are being interrupted is made.

Figure 15:
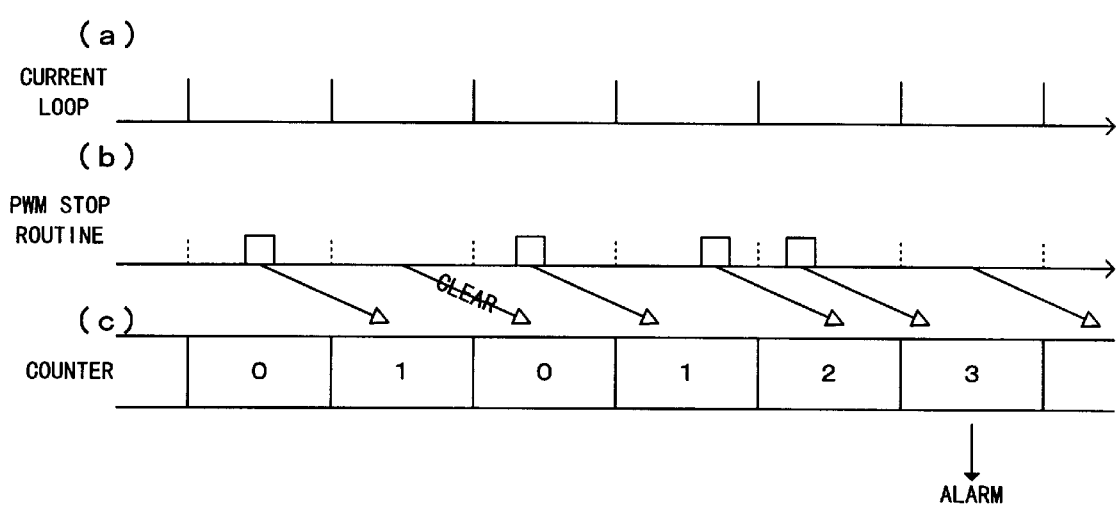
FIG. 15 is a diagram of a processing example wherein the setting value N is made "3" in the alarm action diagrammed in FIG. 14.

FIG. 15 diagrams the case where the set value N is set to "3. " The count value C in the counter is shown in (c) of FIG. 15. That count value is increased when PWM command interruption processing has been performed in the previous current control loop. That count value is cleared to "0" when no PWM command interruption processing has been performed in the previous current control loop.

Accordingly, using this count value C, the period of time during which PWM command interruption processing has been continuously performed can be measured by the number of current control loops that have been performed continuously. By making the set value N the threshold value for alarm generation, moreover, it is possible to detect conditions wherein a current anomaly is occurring continuously.

A fifth embodiment of the present invention is now described with reference to FIGS. 16, 17, and 18.

In this embodiment, as in the fourth embodiment, the motor controller generates an alarm when an anomalous condition occurs continuously or when the frequency of anomalous condition occurrence is high. The interruption-restart control means count a PWM command interruption control every time the processing in one current control loop is completed, generating an alarm when the continuous count value exceeds a prescribed value, and generating an alarm when an anomalous condition is occurring continuously.

Figure 16:
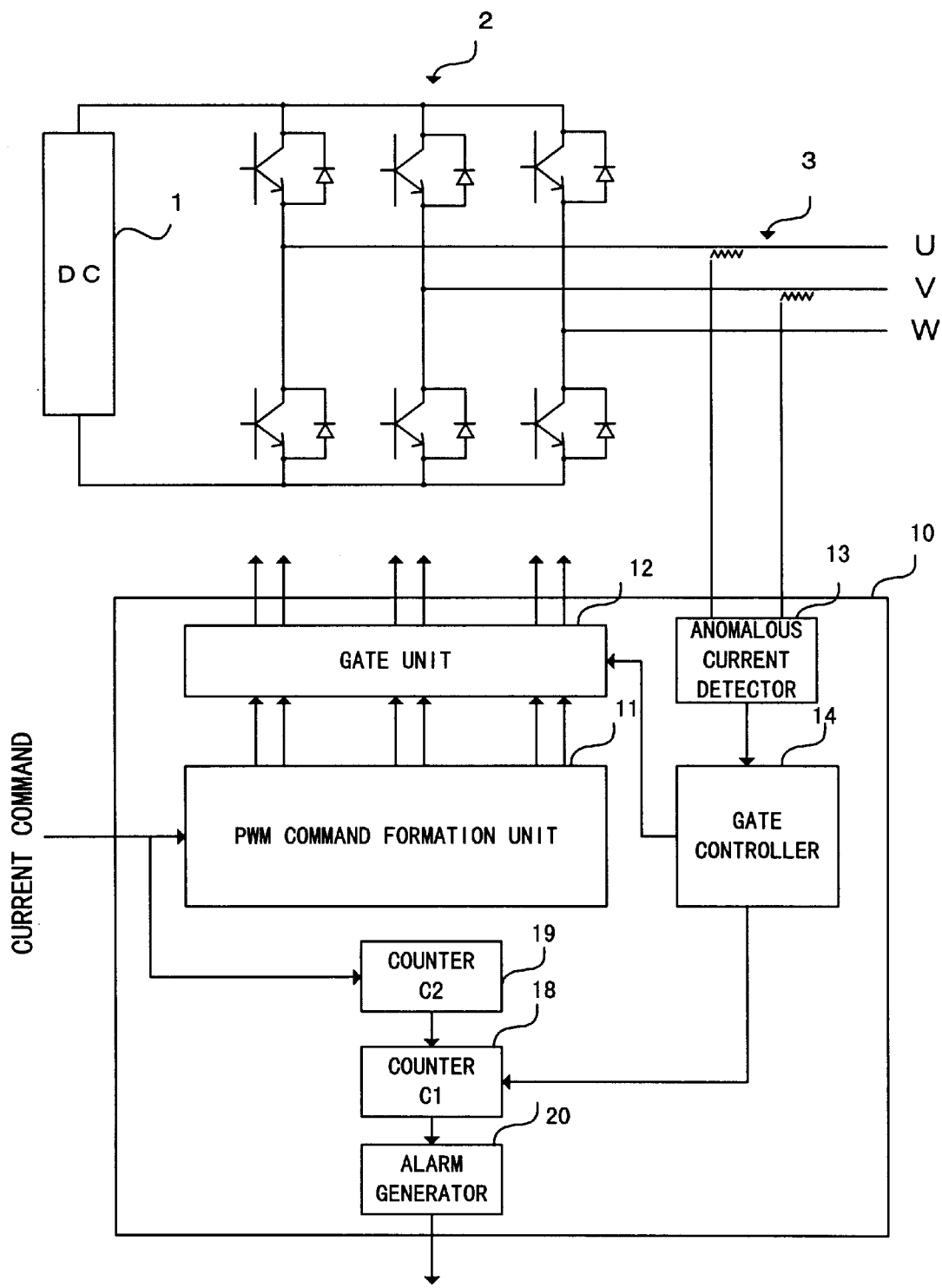
FIG. 16 is a simplified block diagram of the motor controller according to a fifth embodiment of the present invention.

The motor controller based on the PWM system diagrammed in FIG. 16 comprises interruption-restart control means composed of an anomalous current detector 13 and a gate controller 14, as in FIG. 9. These interruption-restart control means, as in the first embodiment, interrupt the supply of PWM commands for at least one phase when the actual current flowing in at least one motor phase has exceeded a prescribed value and then resume the supply of PWM commands.

Also, this motor controller comprises alarm generation means composed of a first counter 18, a second counter 19 and an alarm generator 20. The first counter 18 counts a PWM command interruption control every time one current control loop is executed, receives information to the effect that PWM command supply is in an interrupted state from the gate controller 14, and, at the same time, inputs current commands, incrementing the count value C1 by "1" if during interruption control, and decrementing the count value by "1" if not during interruption control. The second counter 19 counts the number of current control loops executed, inputs current commands and counts them, and clears the count value C2 thereof every reference number of times.

The count value C1 in the first counter 18 becomes an index indicative of the frequency wherewith PWM command interruption controls are implemented. By comparing this with a predetermined set value N1 an alarm can be generated when the frequency of anomalous condition occurrence is high.

Figure 17:
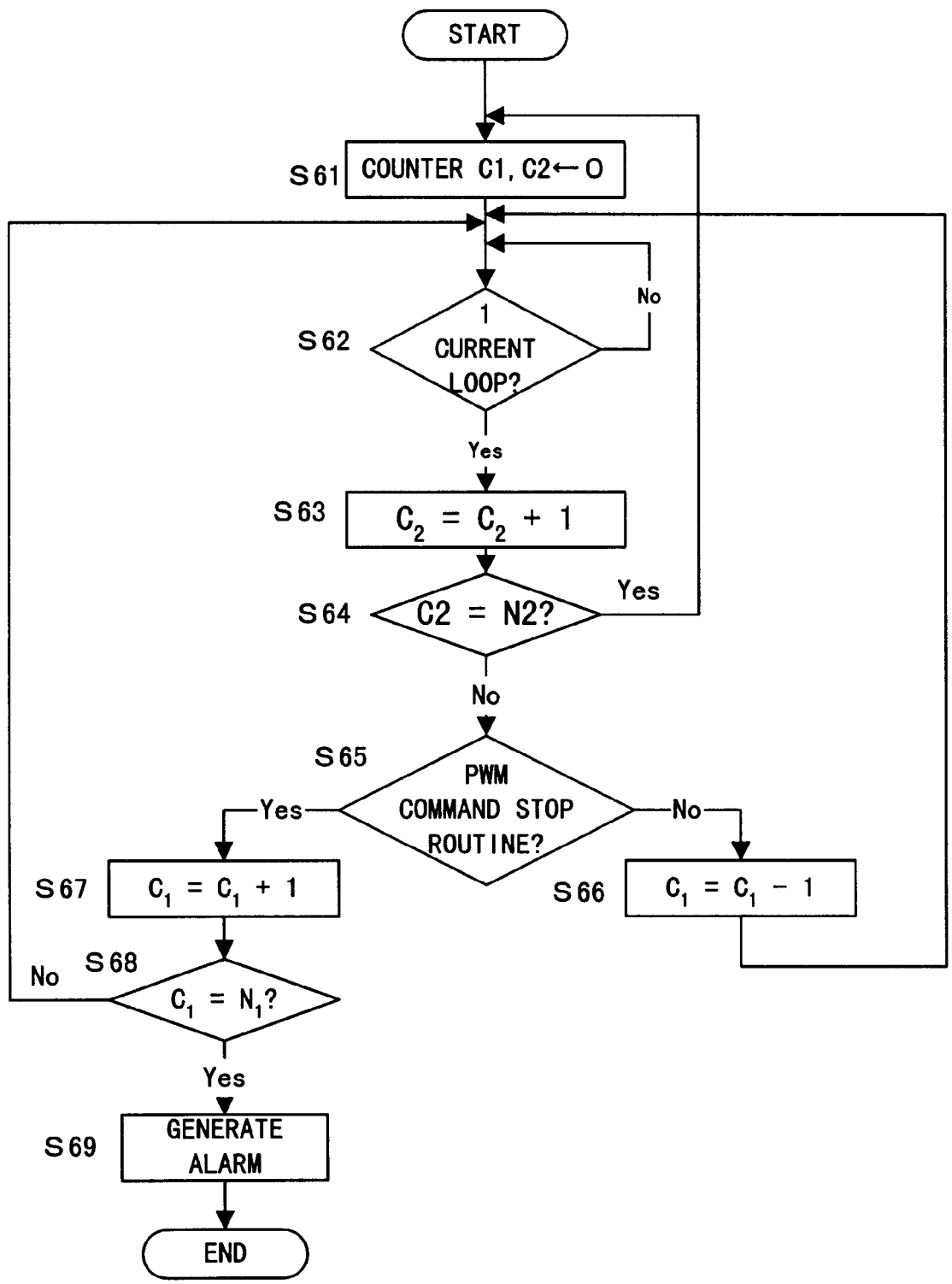
FIG. 17 is a flowchart for describing the alarm action performed by the PWM controller in FIG. 16.

The alarm operation performed by the PWM controller 10 is now described using the flowchart in FIG. 17.

After initializing the count values C1 and C2 in the first and second counters 18 and 19 to "0," respectively, (step S61), a current command is input and a decision is made (in step S62) as to whether or not the execution of one current control loop has been completed. When the execution of one current control loop is completed, the second counter 19 begins counting the count value C2 (step S63), and compares this with the predetermined set value N2. This set value N2 gives the number of times with which the frequency wherewith interruption controls are implemented is measured. When the count value C2 has reached the set value N2 (step S64), the second counter 19 is cleared and the value of the count value C2 is made "0" again (step S61).

The first counter 18 makes a decision (in step S65) as to whether PWM commands are being supplied or PWM command supply is being interrupted, based on commands from the gate controller 14. As a result, if PWM command supply is ongoing, the count C1 in the first counter 18 is decremented by "1" every time the execution of one current control loop is completed (step S66). If PWM commands are being interrupted, on the other hand, the count value C1 is incremented by "1" every time the execution of one current control loop is completed (step S67).

The alarm generator 20 compares the count value C1 in the first counter 18 with the predetermined set value N1 (step S68) and, when the count value C1 has reached the set value N1, generates an alarm (step S69). In the decision in step S68, when the count value C1 has not reached the set value N1, process returns to step S62 and the frequency with which PWM command interruption processing is performed is measured.

Figure 18:
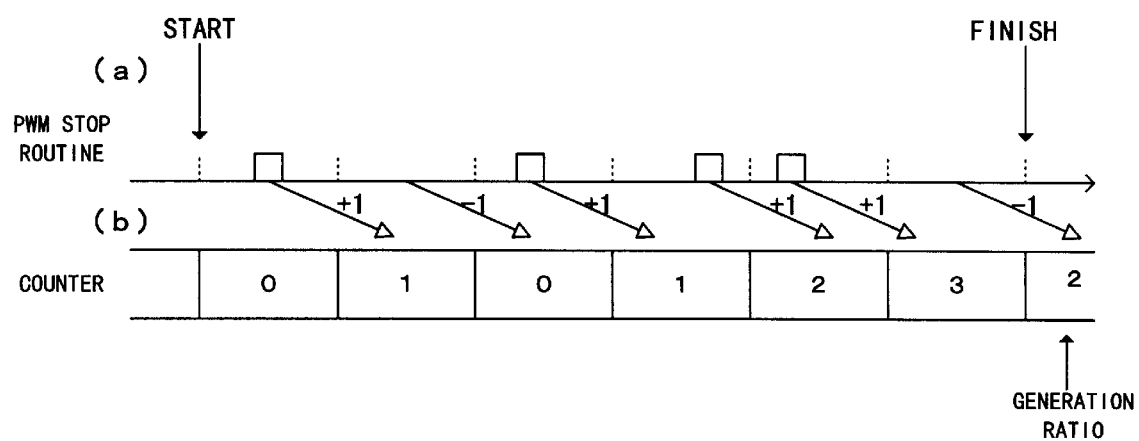
FIG. 18 is a diagram of a processing example wherein the setting values N1 and N2 are made "3" and "6, " respectively, in the alarm action diagrammed in FIG. 17.

FIG. 18 diagrams the case where the set values N1 and N2 are made "3" and "6," respectively. In other words, in the case diagrammed here, the settings are such that an alarm is generated when three or more PWM command interruptions have been generated during six continuous executions of the current control loop.

When the set values N1 and N2 have the values noted above, as indicated below in Table 1, if the count value C1 is "−6," the number of PWM command interruption generated is 0 and the generation ratio is "0." If the count value C1 is "−4," the number of PWM command interruption generations is 1 and the generation ratio is "⅙." There are corresponding generation counts and generation ratios, similarly, when the count value C1 is "−2," "0," "+2," "+4," and "+6."

TABLE 1

| NUMBER OF TIMES PWM INTERRUPTION PROCESSING IS IMPLEMENTED | 0 TIMES | 1 TIME | 2 TIMES | 3 TIMES | 4 TIMES | 5 TIMES | 6 TIMES |
|---|---|---|---|---|---|---|---|
| GENERATION RATIO | 0 | 1/6 | 1/3 | 1/2 | 2/3 | 5/6 | 1 |
| COUNT VALUE C1 | −6 | −4 | −2 | 0 | +2 | +4 | +6 |

Accordingly, the frequency with which PWM command interruption processing is performed can be obtained by this count value C1, and the threshold value for alarm generation can be altered by setting the set values N1 and N2.

Figure 19A:
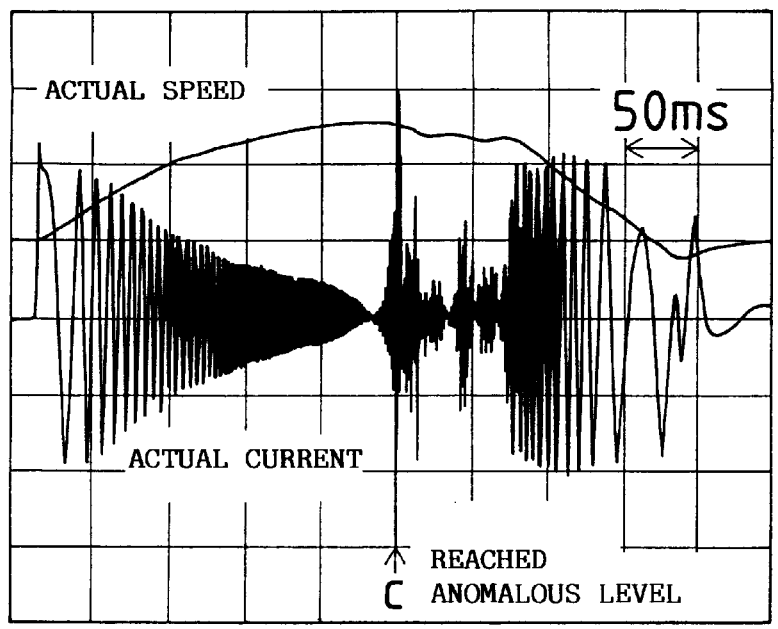
FIGS. 19A and 19B are actual current variation charts for describing control states implemented by a motor current controller of the present invention.
Figure 19B:
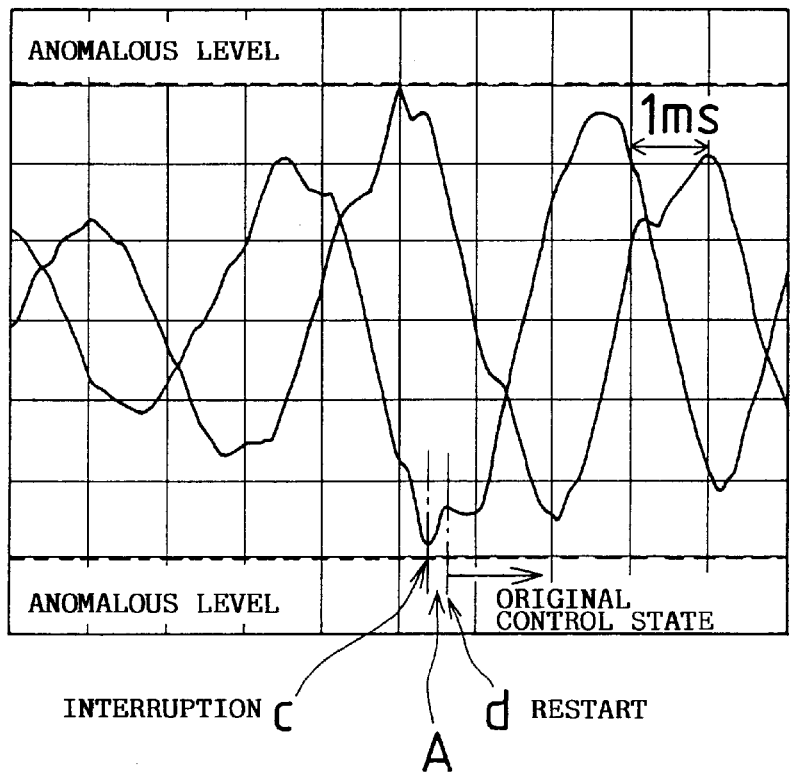
Figure 20A:
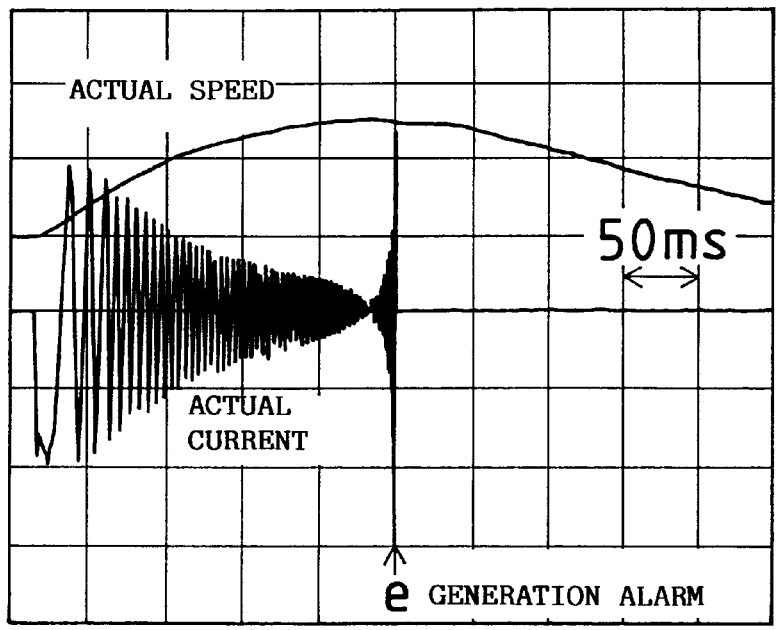
FIGS. 20A and 20B are actual current variation charts for describing control states implemented by a conventional motor current controller.

FIG. 19A is an actual current variation chart for describing control states produced by a motor current controller according to the present invention. FIG. 19B represents the time before and after the occurrence of the anomalous current in FIG. 19A in enlarged form. FIG. 20A, on the other hand, is an actual current variation chart for describing control states resulting with a conventional motor current controller, while FIG. 20B represents the time before and after the occurrence of the anomalous current in FIG. 20A in enlarged form.

In FIGS. 19A and 19B, the actual current reaches an anomalous level at time c, PWM command interruption processing is performed during the interval A from time c to time d, and PWM command control is resumed at time d. Thus normal control can be performed after this resumption.

Figure 20B:
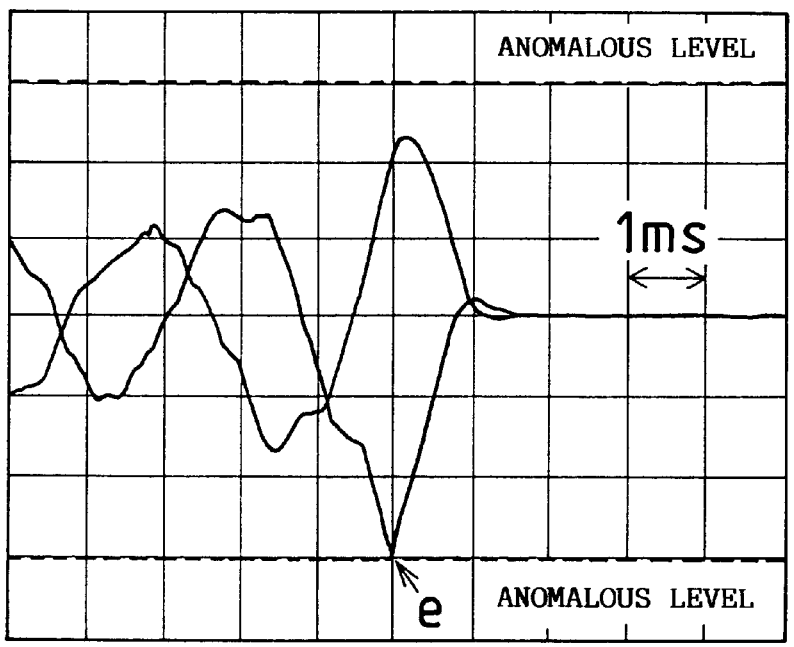

In FIGS. 20A and 20B, on the other hand, the actual current reaches an anomalous level at time e, an alarm state is entered, and control is stopped by the PWM command. Thus motor control is not performed after that.

What is evident if we compare FIGS. 19A and 19B with FIGS. 20A and 20B is that, based on the present invention, control can still be performed continuously when an anomaly occurs, without generating an alarm, with the maximum current kept at the same level as conventionally.

As described in the foregoing, by implementing the present invention, a motor controller is obtained wherewith equipment can be protected when an anomalous current is being generated, while avoiding non-controlling states in the controller.

What is claimed is:

1. A motor controller for controlling current flow to a motor by a PWM system, comprising:
   an anomalous current detector to determine whether or not current flow in at least one phase of said motor has exceeded a prescribed value;
   an interruption-restart controller to receive information that current flow in at least one motor phase has exceeded the prescribed value, from said anomalous current detector, to interrupt supply of PWM commands for at least one phase, and thereafter to maintain the interruption until a predetermined restart condition has been met; and
   a timing unit to determine that the restart condition has been met when a predetermined time has elapsed since the interruption of PWM commands.

2. The motor controller according to claim 1, wherein said interruption-restart controller interrupts supply of PWM commands to all motor phases.

3. The motor controller according to claim 1, wherein said interruption-restart controller interrupts supply of PWM commands only for motor phases wherein actual current has exceeded said prescribed value.

4. The motor controller according to claim 1, wherein said interruption-restart controller generates an alarm when a time period of continuous interruption of supply of PWM commands exceeds a certain value.

5. The motor controller according to claim 1, wherein said interruption-restart controller relies on said timing unit in a determination of whether the restart condition has been met.

6. A motor controller for controlling current flow to a motor by a PWM system, comprising:
   an anomalous current detector to determine whether or not current flow in at least one phase of said motor has exceeded a prescribed value;
   an interruption-restart controller to receive information that current flow in at least one motor phase has exceeded the prescribed value, to interrupt supply of PWM commands for at least one phase, and thereafter to maintain the interruption until a predetermined restart condition has been met; and
   a timing unit to determine that the restart condition is met when an interruption in a current control loop has been generated after interruption of supply of PWM commands.

7. The motor controller according to claim 6, wherein said interruption-restart controller interrupts supply of PWM commands to all motor phases.

8. The motor controller according to claim 6, wherein said interruption-restart controller interrupts supply of PWM commands only for motor phases wherein actual current has exceeded said prescribed value.

9. A motor controller for controlling current flow to a motor by a PWM system, comprising:
   an anomalous current detector to determine whether or not current flow in at least one phase of said motor has exceeded a prescribed value;

an interruption-restart controller to receive information that current flow in at least one motor phase has exceeded the prescribed value, to interrupt supply of PWM commands for at least one phase, and thereafter to maintain the interruption until a predetermined restart condition has been met; and a timing unit to determine that the restart condition is met when a change in a PWM command signal has been generated after interruption of supply of PWM commands.

10. The motor controller according to claim 9, wherein said interruption-restart controller interrupts supply of PWM commands to all motor phases.

11. The motor controller according to claim 9, wherein said interruption-restart controller interrupts supply of PWM commands only for motor phases wherein actual current has exceeded said prescribed value.

12. A motor controller to control current flow to a motor, comprising:

a current detector to determine whether current flow in at least one phase of said motor has exceeded a prescribed value; and an interruption-restart controller to receive information that current flow in at least one motor phase has exceeded a prescribed value, to interrupt supply of PWM commands for at least one phase, to maintain the interruption until a predetermined restart condition has been met, and to generate an alarm when a time period of continuous interruption of supply of PWM commands exceeds a certain value, wherein the time period of continuous interruption is determined by way of a counter that counts the number of current control loops executed continuously during the time period.

13. A motor controller to control current flow to a motor, comprising:

a current detector to determine whether current flow in at least one phase of said motor has exceeded a prescribed value;

an interruption-restart controller to receive information that current flow in at least one motor phase has exceeded a prescribed value, to interrupt supply of PWM commands for at least one phase, and thereafter to maintain the interruption until a predetermined restart condition has been met; and an interruption generation frequency detector to detect a number of times PWM command interruptions have occurred during a prescribed time, and to generate an alarm when the detected number exceeds a set value.

14. The motor controller according to claim 13, wherein said prescribed time is given by a counter that counts a number of current control loops executed continuously.

15. A motor controller for controlling current flow to a motor, comprising:

a current detector to determine whether current flow in at least one phase of said motor has exceeded a prescribed value; and an interruption-restart controller to receive information that current flow in at least one motor phase has exceeded a prescribed value, to interrupt supply of PWM commands for at least one phase, and thereafter to maintain the interruption until a predetermined restart condition has been met, wherein interruption and restart control is performed for all motor phases when the motor is decelerating, but interrupts PWM commands only for phases wherein current has exceeded a prescribed value when the motor is accelerating.

16. A motor pulse width modulation control system, comprising:

an anomalous current detector to determine a current in a plurality of phases of a motor, and to determine whether the current exceeds a predetermined value;

an interruption controller to interrupt a supply of pulse width modulation commands in a phase of the motor containing a detected anomalous current;

a timing unit to determine a timing after the interruption of the supply of the pulse width modulation commands; and a restart controller to restart supply of the interrupted commands when a predetermined restart condition has been met, wherein a phase of the motor which does not contain the anomalous current is also interrupted when the detected anomalous current continues to be detected after a predetermined period of time has elapsed.

* * * * *